US005381497A

United States Patent [19]
Toland et al.

[11] Patent Number: 5,381,497
[45] Date of Patent: Jan. 10, 1995

[54] FIBER OPTIC CONNECTOR WITH VENTED FERRULE HOLDER

[75] Inventors: David S. Toland, Minnetonka; Michael F. McGuire, Eden Prairie; Gary S. Farrell, Shoreview; Kevin J. Pitkin, Eagan; Michael S. Beard, Eden Prairie; David Emmons, Plymouth; James W. Conroy, Prior Lake; Robert J. Ziebol, Blaine, all of Minn.

[73] Assignee: ADC Telecommunications, Inc., Minneapolis, Minn.

[21] Appl. No.: 94,451

[22] Filed: Jul. 27, 1993

[51] Int. Cl.6 .............................. G02B 6/26
[52] U.S. Cl. ........................ 385/80; 385/60; 385/78; 385/66; 385/84; 385/137; 385/139
[58] Field of Search ............ 385/53, 55, 60, 65, 385/66, 68, 70, 72, 75, 76, 77, 78, 80, 84, 85, 137, 138, 139

[56] References Cited

U.S. PATENT DOCUMENTS

| 4,330,171 | 5/1982 | Malsot et al. | 385/80 X |
| 4,580,874 | 4/1986 | Winter et al. | 385/109 X |
| 4,875,754 | 10/1989 | Rao et al. | 385/134 X |
| 5,071,218 | 12/1991 | Nishimoto | 385/60 |
| 5,206,921 | 4/1993 | Okada et al. | 385/134 |
| 5,216,733 | 6/1993 | Nagase et al. | 385/60 |
| 5,231,684 | 7/1993 | Narciso, Jr. et al. | 385/80 |
| 5,235,664 | 8/1993 | Okada et al. | 385/134 |
| 5,241,613 | 8/1993 | Li et al. | 385/80 X |
| 5,251,279 | 10/1993 | Shibata et al. | 385/60 X |

Primary Examiner—Brian Healy
Attorney, Agent, or Firm—Merchant, Gould, Smith, Edell, Welter & Schmidt

[57] ABSTRACT

A fiber optic connector includes a ferrule received within a ferrule holder. The ferrule holder is provided with venting to evacuate air from an adhesive receiving chamber to avoid air pocket formation in adhesive.

6 Claims, 4 Drawing Sheets 5,381,497

FIBER OPTIC CONNECTOR WITH VENTED FERRULE HOLDER

BACKGROUND OF THE INVENTION

1. Field of the invention

This invention pertains to connectors for optical fibers for use in the telecommunications and data transmission industries. More particularly, this invention pertains to a fiber optic connector having means to prevent an air gap in an adhesive retaining the fiber within the connector.

2. Description of the Prior Art

In the prior art, connectors for optical fibers are well known. Such connectors include a ferrule (which is typically ceramic) having an axially extending bore. The fiber is placed within the bore. Also, as is typical, the ferrule is retained within a ferrule holder (commonly referred to as a hub). To retain the fiber within the ferrule, an adhesive (commonly, epoxy) is admitted into the ferrule holder and forced under pressure into the bore of the ferrule. The fiber is passed through both the holder and the bore and is retained within the ferrule by means of the adhesive.

From time to time, air pockets may form within the adhesive which is urged into the ferrule holder. If air pockets are formed after the fiber is placed within the ferrule, the adhesive will harden resulting in an air pocket surrounding at least a portion of the fiber. Accordingly, that portion of the fiber is not supported by adhesive.

The presence of an unsupported segment of fiber within a connector is undesirable. The unsupported fiber can have stress points. Further, minute bends can occur in the fiber in the unsupported region due to unequal thermal expansion and contraction. Also, the unsupported fiber can possibly bend during vibration or shock which also increases the stress on the fiber. For these, and other reasons, the unsupported fiber is more susceptible to breakage.

In practice, the occurrence of undesirable air pockets and resulting breakage of fibers within a fiber optic connector is fairly rare. However, even small possibilities of breakage are undesirable. Optical fibers in use today carry signals at rates in excess of 2.4 gigabits per second. In terms of voice communications, a single fiber may be carrying in excess of thirty-two thousand simultaneous voice telephone conversations. As a result, the breakage of a single fiber can disrupt service to many telephone customers. The problems associated with such breakage is particularly acute with respect to data transmission since data can be lost in the event of a fiber breakage.

U.S. Pat. No. 5,206,921 which issued on Apr. 27, 1993 to Okada et al. teaches a ferrule (element F in the patent) secured within a support block 1 and sealed thereto by means of an O-ring 3. An axial end F3 of the ferrule is in communication with a passage 4 formed in the support block 1. By means of a suction unit 5, a suction is applied to the passage 4. An adhesive is placed in an aperture F1 while the suction is applied to passage 4. In reviewing U.S. Pat. No. 5,206,921, it is noted that the patent does not address the formation of air pockets or the resolution of the problem associated with air pockets. Instead, the patent is directed to the automated application of adhesive to the axial end F3 of the ferrule. The patent recognizes that due to prior manual adhesive attachment operations, the amount of time to place a mass of adhesive to the end of the ferrule was long and adhesives can, from time to time, adhere to the operator's hands or undesired areas of the ferrule.

It is an object of the present invention to provide means for preventing air pocket formation in a ferrule regardless of whether adhesive is applied manually or automated.

SUMMARY OF THE INVENTION

According to a preferred embodiment of the present invention, a fiber optic connector is disclosed including a ferrule for receiving an optical fiber. The ferrule has an exterior surface extending from a first ferrule end to a second ferrule end. A fiber receiving bore is formed through the ferrule and extends through the first and second ferrule ends. A ferrule holder is provided having a first internal wall defining a first chamber and a second internal wall defining a second chamber. The two chambers are in fluid flow communication. The first internal wall is sized for the first ferrule end to be inserted into the first chamber and retained within the ferrule holder. Opposing surfaces of the ferrule and the ferrule holder define an adhesive receiving chamber for receiving an adhesive. A vent is provided for defining an air flow passage from the adhesive receiving to an exterior of the ferrule holder.

DESCRIPTION OF THE PREFERRED EMBODIMENT

Referring now to the several drawing figures in which identical elements are shown identically throughout, a description of the preferred embodiment will now be provided.

Figure 3:
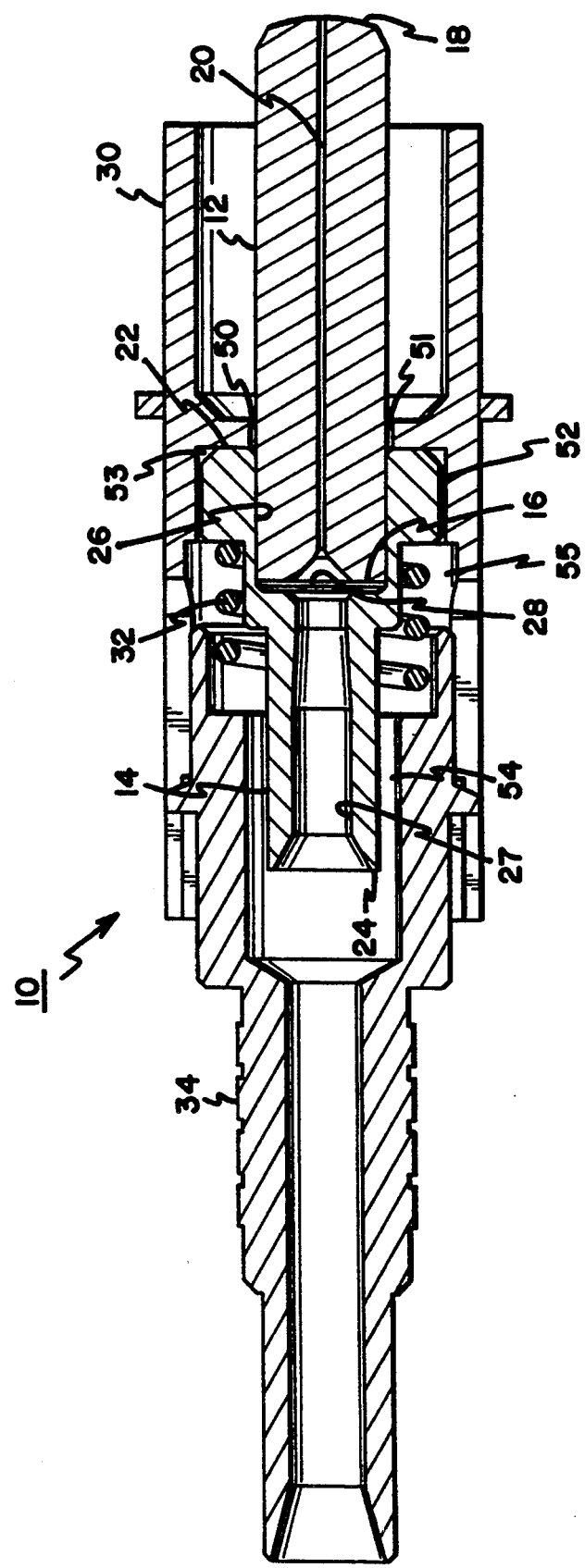
FIG. 3 is a longitudinal cross-section view of a prior art fiber optic connector.

For ease of illustration of the present invention, a prior art fiber optic connector (a so-called "SC connector") is shown in FIG. 3. The connector 10 includes a ferrule 12 in a ferrule holder 14 (commonly referred to as a "hub").

The ferrule 12 is cylindrical and is commonly formed of ceramic. The ferrule 12 extends from a first axial end 16 to a second axial end 18. A fiber receiving bore 20 extends axially through the ferrule 12 and is exposed through both the first and second ends 16, 18.

The ferrule holder extends from a first end 22 to a second end 24. At the first end 22, ferrule holder 14 has an internal cylindrical wall 26 which defines a chamber sized to receive the ferrule 12 and to hold the ferrule 12 in axial alignment within the first end 22. Commonly, the dimensions of the internal wall 26 are sized such that the ferrule 12 may be press fit into ferrule holder 14.

At the second end 24, the ferrule holder 14 also has an internal wall 28 to define a generally cylindrical chamber extending through the ferrule holder 14. When the ferrule 12 is placed within the ferrule holder 14 as shown in FIG. 3, an adhesive receiving chamber 28 is defined by opposing surfaces of the ferrule holder 14 and the ferrule 12. An adhesive is admitted into the chamber 28 through end 24. The adhesive is urged to flow into the fiber receiving bore 20. The adhesive can either be admitted under pressure or a vacuum can be applied to the ferrule (as taught in the aforementioned U.S. Pat. No. 5,206,921).

After the bore 20 is filled with the adhesive (commonly an epoxy), an optical fiber (not shown for ease of illustration) is inserted within the bore 20. The assembly of the ferrule 12 and ferrule holder 14 is then placed within the connector housing 30 with a spring 32 urging the ferrule holder 14 and ferrule 12 axially out of the housing 30. A strain relief boot 34 is typically provided to prevent undesirable strain on the fiber secured within the connector 10.

Figure 1:
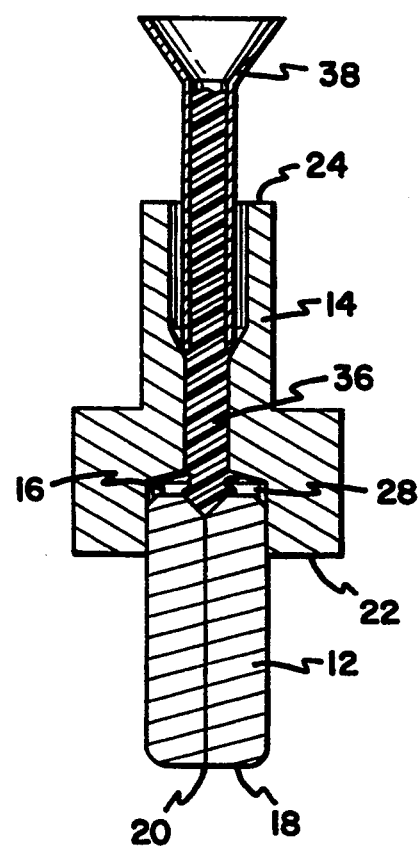
FIG. 1 is a schematic representation of a prior art technique for injecting adhesive into a ferrule and ferrule holder assembly.

As mentioned, the procedure for admitting epoxy into the ferrule holder 14/ferrule 12 assembly can result in formation of an air pocket within the epoxy. This is best illustrated with reference to FIGS. 1 and 2. FIG. 1 shows the prior art technique of forcing an adhesive 36 under pressure from an injection needle 38 into the adhesive receiving chamber 28 such that the adhesive will flow under pressure into the fiber receiving bore 20.

Figure 2:
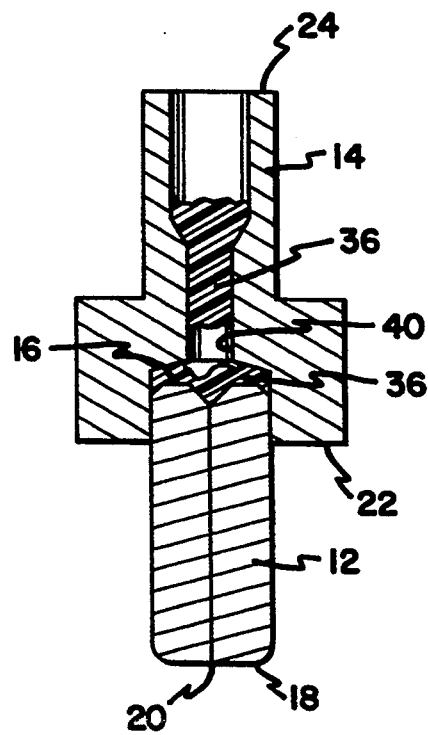
FIG. 2 illustrates a consequence of the prior art technique of FIG. 1 resulting in formation of an air pocket within the injected adhesive.

FIG. 2 shows a result which can occur from time to time using the technique of FIG. 1. Namely, an air pocket 40 can result within the adhesive receiving chamber 28. As a result of formation of the air pocket 40, when a fiber (not shown) is passed through the ferrule holder 14 and into the bore 20 of ferrule 12, a segment of the fiber is unsupported in the region of the air pocket 40. As previously discussed, an unsupported segment of fiber resulting from an air pocket 40 is undesirable and can lead to breakage of the fiber.

Figure 4:
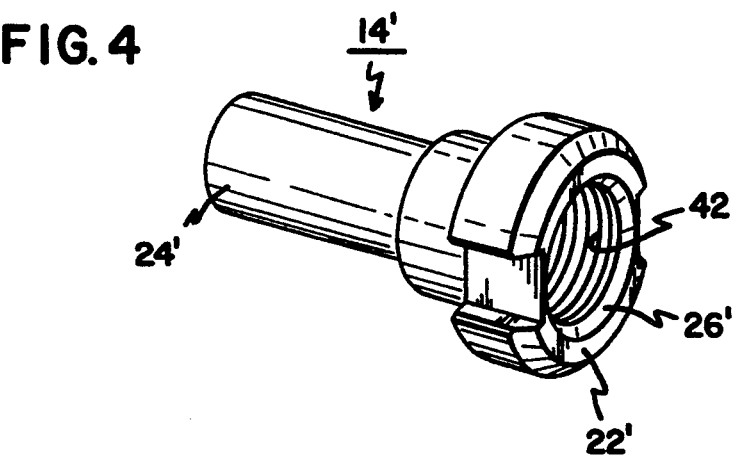
FIG. 4 is a perspective view of a ferrule holder according to the present invention.
Figure 5:
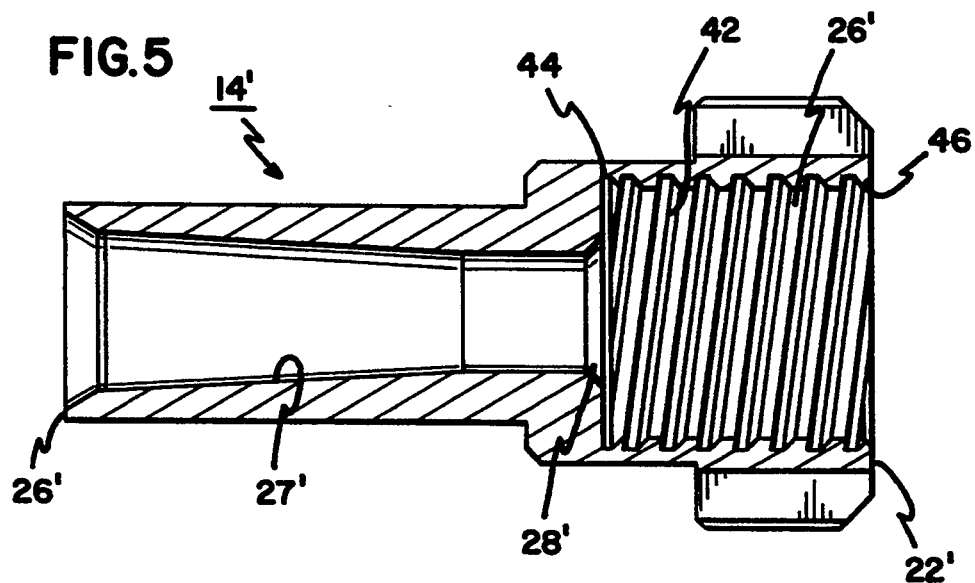
FIG. 5 is a longitudinal cross-sectional view of the ferrule holder of FIG. 4.
Figure 6:
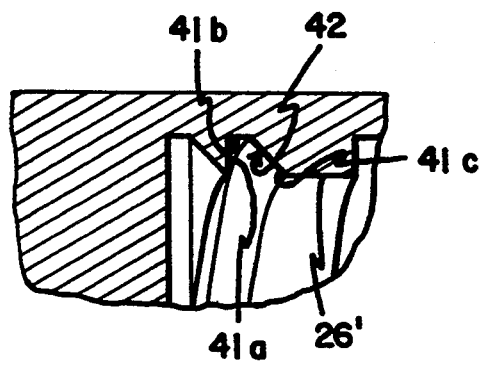
FIG. 6 is an enlarged view of a portion of the view of FIG. 5.

With best reference to FIGS. 4-6, a novel ferrule holder 14' is shown. The holder 14' is similar to holder 14 in many respects and identical elements will be numbered identically except for the addition of an apostrophe (recitation of the additional identical elements not being required with a description of the prior art ferrule holder 14 sufficing as a description of the identical elements). It will be noted that the external dimensions of ferrule holder 14' are identical to those of ferrule holder 14 such that ferrule holder 14' can readily be inserted into the housing 30 of the SC connector 10 without further modifications or adaptations of the connector 10.

The novel ferrule holder 14' includes vent means for defining an air flow passage from the adhesive receiving chamber (chamber 28 in FIG. 3) to an exterior of the ferrule holder 14'. The air passage is defined by means of a groove 42 formed in the wall 26' of the ferrule holder 14'. The groove 42 extends from a first end 44 exposed to the adhesive receiving chamber 28' (FIG. 5) and a second end 46 exposed to the exterior of the holder 14' adjacent first end 22'. As a result of the groove 42, when the ferrule 12 is press fit against wall 26', opposing surfaces of the outer wall of the ferrule 12 and the groove 42 defining surfaces 41a, 41b, 41c (FIG. 6) of wall 26' results in an enclosed air passage extending from chamber 28' to the exterior of the ferrule holder 14' with the ends 44,46 of the air passaged exposed, in air flow communication, to the adhesive receiving chamber 28' and the exterior of the ferrule holder 14', respectively. As shown, the groove 42 is a spiral groove such that the resulting air passage is a spiral shaped passage for reasons that will be discussed.

Upon injection of an adhesive into chamber 28', the groove 42 permits the air from the chamber 28' to be evacuated through the groove 42 avoiding formation of an air pocket. To lower the likelihood that an air pocket is formed, it is desirable that a plurality of such grooves 42 will be formed. For example, two, four or more such grooves 42 can be formed in wall 26' resulting in a multiple helix of grooves 42 within the wall 26'.

With attention now redirected to FIG. 3 the reader will appreciate that it is undesirable for adhesive to exit the ferrule holder (such as ferrule holder 14' or, for ease of illustration, ferrule holder 14 in FIG. 3). Opposing surfaces of the ferrule 12, ferrule holder 14, housing 30 and boot 34 define a plurality of passages such as passages 50-55. These passages permit relative axial movement of the ferrule holder 14/ferrule 12 assembly within housing 30. If adhesive were to enter any of these passages 50-55, the adhesive, after setting, could prevent the desirable axial movement. Accordingly, it is important to design grooves 42 to prevent adhesive from exiting the ferrule holder 14'.

Adhesives (such as epoxy for use in securing optical fibers within the bores of ferrules 12) have a wide range of viscosities and flow properties. We have found that the adhesive can be retained within the ferrule holder 14' by designing the grooves 42 in such a manner that epoxy or other adhesive cannot flow completely through the air passages defined by the groove 42.

In practice, adhesive is admitted to a ferrule holder/ferrule assembly for a period of time until a technician notes that the adhesive exits the fiber receiving bore 20 at the end 18 of the ferrule 12. At this point, the technician knows that the adhesive is fully admitted to bore 20 to secure the fiber within bore 20 along its entire length. Accordingly, grooves 42 are designed to restrict adhesive flow through the grooves 42 such that the potential flow rate of epoxy within the grooves 42 is restricted so that adhesive will not flow out of the end 46 of groove 42 by the time adhesive is flowing out bore 20 at end 18. This design can be accomplished in numerous ways. For example, with a groove 42 having the same cross-sectional area as bore 20, groove 42 can be provided with a length greater than the length of bore 20. To achieve such a length, spiral grooving 42 is provided in wall 26' such that the total length of the groove 42 from end 44 to end 46 is greater than the length of bore 20. Alternatively, the groove 42 can be provided with an extremely small cross-sectional area such that air can be vented through the groove 42 but the groove 42 having a higher resistance to adhesive flow than does bore 20. Any combination of these designs (i.e., the length of the groove 42 or restricted cross-sectional area of the groove 42) can be used in combination to achieve the desired result that adhesive does not exit at end 46 of the groove 42 by the time adhesive is exiting the bore 20 of ferrule 12.

Figure 7:
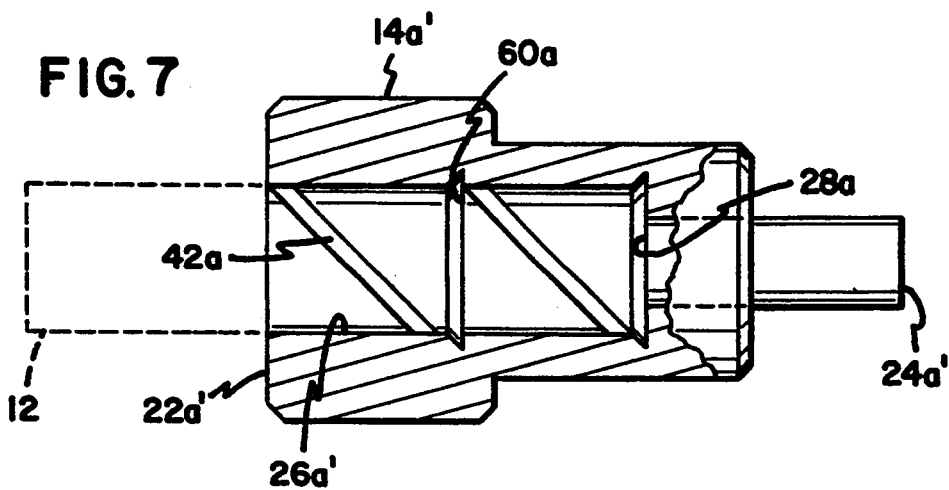
FIG. 7 is a schematic longitudinal cross-section view of a first alternative embodiment of a ferrule holder according to the present invention.
Figure 8:
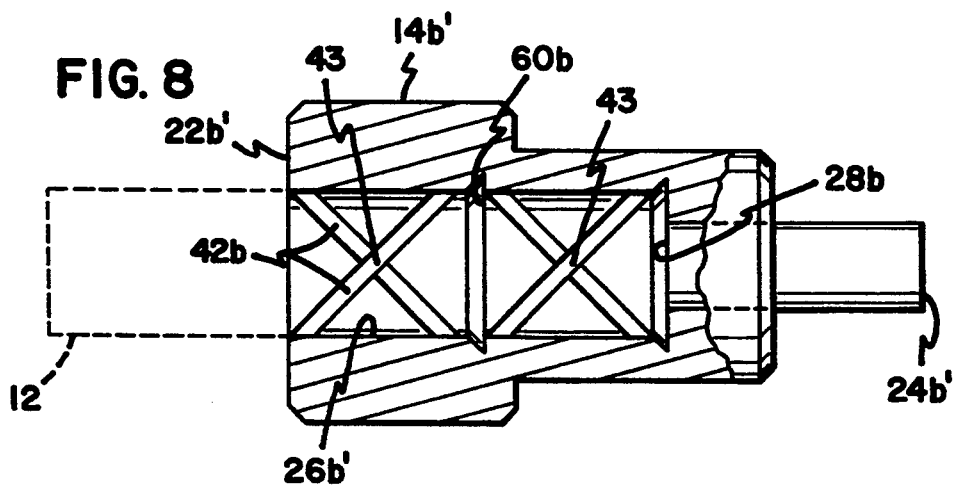
FIG. 8 is the view of FIG. 7 showing an alternative embodiment.
Figure 9:
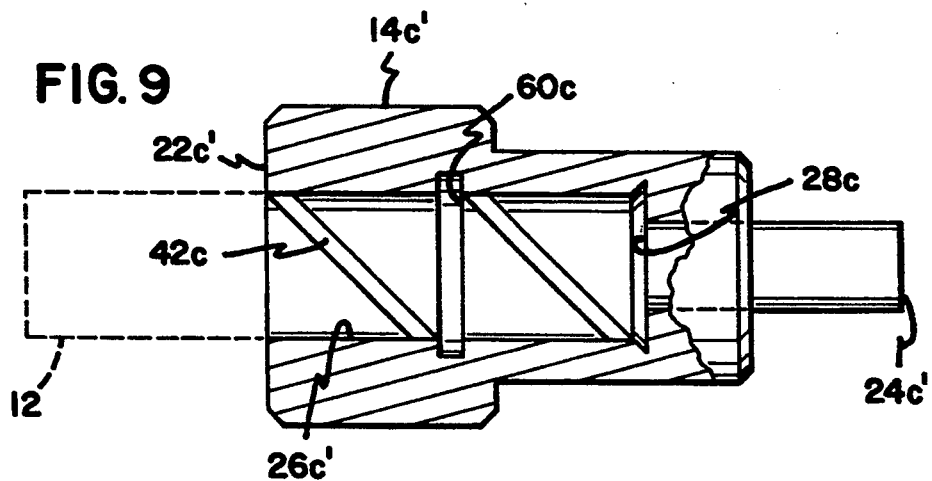
FIG. 9 is the view of FIG. 7 showing a further alternative embodiment.

Alternative embodiments of the groove geometry are shown in FIGS. 7–9. In FIGS. 7–9, a plurality of ferrule holders 14a', 14b', and 14c' are shown each incorporating the present invention. The ferrule holders 14a'–14c' are identical to ferrule 14' differing only as will be specifically described. Elements in common with holder 14' are numbered identically with the addition of the letters "a", "b" and "c" to illustrate the differences between FIGS. 7–9, respectively.

Each of the embodiments of FIGS. 7, 8 and 9 is similar in that grooves 42a, 42b and 42d, respectively are provided in a spiral format. In each of these embodiments, two parallel grooves will be provided in a double helix spiral formed on interior walls 26a', 26b' and 26c' respectively. In FIG. 8, two pairs of double helix grooves 42b' are provided resulting in the fact that the grooves 42b' cross at points of intersection 43. In each of the embodiments of FIGS. 7–9, a reservoir 60a, 60b and 60c is provided halfway between the adhesive receiving chamber 28a, 28b and 28c, respectively, and the end 22a', 22b', and 22c' of the ferrule holders 14a', 14b', 14c' respectively. The reservoirs 60a, 60b and 60c are all provided in form of annular grooves with grooves 60a and 60b being identical and groove 60c illustrated to show an enlarged geometry groove. The use of the annular grooves 60a, 60b, 60c is to provide a reservoir into which any epoxy may flow from grooves 42a, 42b and 42c and collect within the reservoir 60a, 60b and 60c to further prevent epoxy from flowing completely out of the grooves 42a, 42b and 42c.

With the foregoing invention, Applicants can inject epoxy into the fiber receiving bore of the ferrule and avoid formation of the air pocket by reason of any entrapped air being vented through the groove 42. As a result, unsupported regions of fibers within the connector are avoided. Also, epoxy is retained with the ferrule holder to avoid undesired adhesion of the ferrule or ferrule holder to other components of the connector.

In the foregoing detailed description of the present invention, it has been shown how the objects of the invention have been obtained in the preferred manner. However, modifications and equivalents of the disclosed concepts such as those which readily occurred at one skilled in the art are intended to be included within the scope of the present claims.

What is claimed is:

1. A fiber optic connector comprising:
   a ferrule for receiving an optical fiber, said ferrule having an exterior surface extending from a first ferrule end to a second ferrule end, a fiber receiving bore formed through said ferrule and extending through said first and second ferrule ends;
   a ferrule holder extending from a first holder end and a second holder end, said ferrule holder having a first internal wall at said first holder end with said first internal wall defining a first chamber exposed through said first holder end;
   said ferrule holder including a second internal wall at said second holder end with said second internal wall defining a second chamber exposed through said second holder end; said first chamber in fluid flow communication with said second chamber;
   said first internal wall sized for said first ferrule end to be inserted into said first chamber with said ferrule retained within said ferrule holder and with opposing surface of said first ferrule end and said ferrule holder defining an adhesive receiving chamber for receiving an adhesive and with said adhesive receiving chamber in fluid flow communication with said fiber receiving bore; and
   vent means for defining an air flow passage from said adhesive receiving chamber to an exterior of said ferrule holder.

2. A fiber optic connector according to claim 1 wherein said vent means includes means for defining said air flow passage extending from a first vent end exposed to said adhesive receiving chamber and a second vent end exposed to said exterior, said air flow passage sized for said adhesive to flow, in response to a pressure, from said adhesive receiving chamber through said air flow passage at a flow rate selected for said adhesive to flow out of said fiber receiving bore in response to said pressure before said adhesive flows out of said second vent end.

3. A fiber optic connector according to claim 1 wherein said vent means include at least a first groove formed in said first internal wall and extending from said adhesive receiving chamber to said first holder end.

4. A fiber optic connector according to claim 3 further comprising an annular groove formed in said first internal wall in communication with said first groove.

5. A fiber optic connector according to claim 3 wherein said first groove is one of a plurality of grooves formed in said first internal wall and each extending from said adhesive receiving chamber to said first holder end.

6. A fiber optic connector according to claim 1 wherein said air flow passage is sized to have a vent length from a first end in communication with said adhesive receiving chamber to a second end in communication with said exterior with said vent length greater than a length of said fiber receiving bore.

* * * * *